UNITED STATES PATENT OFFICE 2,496,275

POLYMERS AND COPOLYMERS OF UNSATURATED AMIDES

Joseph B. Dickey, Rochester, N. Y., assignor to Eastman Kodak Company, Rochester, N. Y., a corporation of New Jersey No Drawing. Application August 17, 1945,
Serial No. 611,241

10 Claims. (Cl. 260—78.5)

This invention relates to polymers prepared from unsaturated compounds containing carboxyamide or sulfonamide groups.

It has been recognized previously that the polymers prepared from monomers having vinyl, isopropenyl, and like groups are unsuitable for use in the making of fibers due to the softening characteristics of those polymers at but slightly elevated temperatures. Because of this other polymers have been primarily considered for use in textile manufacture.

One object of my invention is to provide a new series of polymers having good heat resistance properties. Other objects of my invention will appear herein.

I have found that polymers prepared from monomers having the formula:

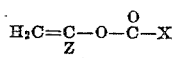

wherein Z is selected from hydrogen or hydrocarbon groups (alkyl, aryl, cylic, etc.) and X is selected from carboxyamide, sulfonamide, or R+carboxyamide or sulfonamide, R being a hydrocarbon group, exhibit good heat resistance and are valuable for use in preparing fibers having good heat resistant properties.

The monomers which are suitable for use as the starting material for preparing polymers in accordance with our invention may be prepared in various ways. The following examples illustrate some of those methods:

*Example I.*—100 parts of vinyl acetate containing 10 parts of sulfonamide acetic acid are treated with 0.2 part of mercuric oxide. A faint excess of sulfuric acid (based on mercuric oxide) is added and the mass refluxed for 3 hours. The catalyst is destroyed by addition of an excess of sodium carbonate and then the excess vinyl acetate is distilled off in vacuum. The residue is purified by crystallization from acetic acid and water giving the compound,

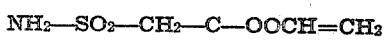

*Example II.*—100 parts of maleamic acid was stirred with 200 parts of dioxan containing 1 part of mercuric sulfate prepared in situ by adding sulfuric acid in slight excess to the dioxan containing mercuric oxide. The mixture was well stirred and a slow stream of acetylene gas was passed in for 8 hours at 60° C. The vinyl ester of maleamic acid,

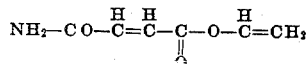

is obtained from the reaction mixture as a white crystalline solid.

*Example III.*—25 parts of sulfonamide acetic acid anhydride was heated with 15 parts of acetaldehyde and 1 part of sodium acetate in an autoclave at 200° C. for 1 hour in the presence of copper acetate. The product is purified by recrystallization from acetic acid. A good yield of the vinyl ester, $NH_2SO_2-CH_2-COOCH=CH_2$ is obtained.

*Example IV.*—20 parts of

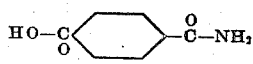

was heated to reflux in 100 parts of vinyl acetate for 3 hours in the presence of $HgSO_4$ prepared in situ as in Example I. The excess vinyl acetate was removed by vacuum distillation and the vinyl ester,

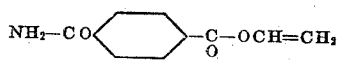

was obtained.

These monomers may be polymerized by any of the emulsion procedures listed in the prior art such as, for example, in mass, in emulsion, in solution or by bead polymerization. These polymerization reactions may be initiated by the means described in the prior art for this purpose such as heat, light, oxygen, chemical catalyst, organic and inorganic peroxide, wave motion or any combination of the above. Particularly valuable polymers are obtained if the polymers are prepared under super-atmospheric pressure conditions as, for example, in excess of 250 atmospheres and preferably at least 750 atmospheres or more.

My invention includes the polymerization of one or more monomers having the formula

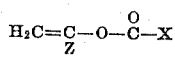

with other unsaturated compounds which will copolymerize therewith such as vinyl acetate, vinyl chloride, vinylidine chloride, butadiene, methyl vinyl ether, isopropenyl methyl ketone, fumaric acid amides, cyanofumaric acid esters or amides, fumaronitrile, styrene, methyl methacrylate, acrylonitrile, vinyl urethane, vinyl urea or ethylene malononitrile. For some purposes the carboxyamide or sulfonamide or both should be at least 20%, and preferably 50% of the mixture with other monomers in forming co-polymers thereof to assure heat resistant properties in the resulting product.

The following examples illustrate the preparation of polymers in accordance with my invention:

*Example V.*—25 parts of

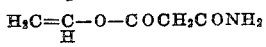

and .05 part of benzoyl peroxide were heated together in a sealed tube at 50° C. until solid. When cool the resulting product was removed and purified by dissolving in acetone, pouring into water, filtering, and drying.

In place of the above,

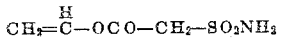

may be employed to prepare a polymer in the same way.

*Example VI.*—25 parts of

was placed in a small autoclave and polymerized by slowly warming to 180° C. over a period of 20 hours under a pressure of 300 atmospheres. A very tough product results. Other unsaturated compounds may be polymerized in this manner, such as

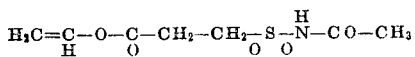

or

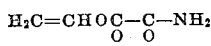

*Example VII.*—A mixture of 10 parts of

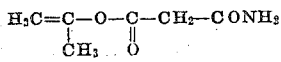

10 parts of

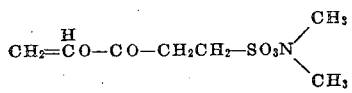

and 0.01 part of pelargonyl peroxide was polymerized in a sealed tube and worked up as described in Example V. A slightly colored, tough resin resulted.

*Example VIII.*—10 parts of

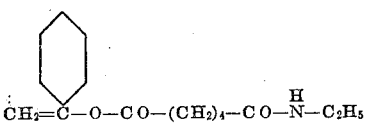

10 parts of

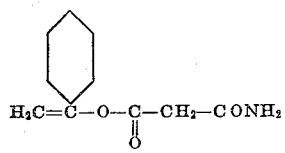

and 25 parts of

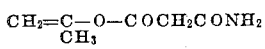

were heated in a sealed tube with 0.1 part benzoyl peroxide at 50° C. for 2 days and slowly raised to 75° C. The polymer was worked up as in Example V. A slightly colored tough solid was obtained.

*Example IX.*—10 parts of

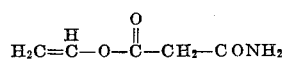

and 10 parts of vinyl acetate were polymerized in a sealed tube using benzoyl peroxide catalyst. The tube was heated at 40° C. for 6 days and then at 60° C. for a time. The product was refined as described in Example V. Instead of vinyl acetate, there may be used isopropenyl acetate, cyclohexenyl acetate, vinyl methane, vinyl benzoate, or p-acetamino vinyl benzoate in this process.

*Example X.*—20 parts of

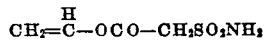

80 parts of vinyl chloride and 0.1 part of pelargonyl peroxide were placed in a sealed tube and slowly warmed to 50° C. over 5 days. When polymerization is complete the product is recovered by the method described in Example V. Instead of vinyl chloride any of the following may be employed: vinyl fluoride, iso-propenyl chloride, α-fluorostyrene, vinylidine dichloride, vinylidine chloride-fluoride, β-chloroallyl alcohol or its esters.

*Example XI.*—10 parts of

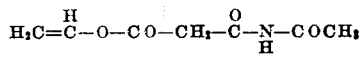

10 parts of dimethyl fumarate and 10 parts of diethyl fumarate were polymerized in mass using 0.02 part of benzoyl peroxide as catalyst. The temperature may vary between 10 and 150° C. but advantageously 40–60° is used. The resulting product is hard and tough. Super atmospheric pressures may be employed to advantage in this reaction. Instead of the fumarates, the maleates, or citraconates may be employed.

*Example XII.*—10 parts of

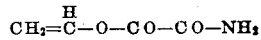

and 25 parts of methyl acrylate were polymerized in the manner described in the preceding example, using a mixture of benzoyl peroxide and pelargonyl peroxide as catalyst. A hard, tough, clear polymer results. In this reaction any of the following may be substituted for the acrylate: phenyl acrylate; methyl methacrylate; α-chloromethyl acrylate; α-fluoromethyl acrylate; α-methoxy methyl acrylate; methyl crotonate, or α-acetamino methyl acrylate.

*Example XIII.*—10 parts of

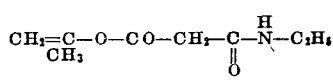

5 parts of acrylonitrile and 10 parts of methacrylonitrile were polymerized as in Example V. Care is necessary to prevent the formation of an insoluble polymer.

*Example XIV.*—25 parts of

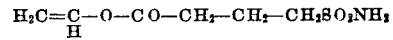

and 10 parts of methyl vinyl ketone were polymerized as in Example V. A tough acetone soluble polymer was obtained. In this procedure there may be used instead of methyl vinyl ketone any one of the following: iso-propenyl ketone, divinyl ketone, α-fluoro vinyl methyl ketone, vinyl tri-fluoro methyl ketone.

*Example XV.*—25 parts of

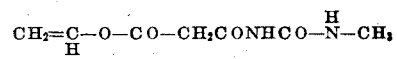

and 25 parts of vinyl methyl sulfone was polymerized at 40–60° C. using 0.1 part pelargonyl peroxide as the catalyst. A tough yellowed polymer is obtained. In this procedure, as the sulfone, any of the following may be used: isopropenyl vinyl sulfone, α-phenyl vinyl sulfone, α-chloro or fluoro vinyl sulfone, vinyl sulfone amide,

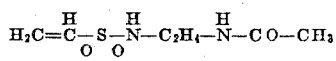

and the like.

*Example XVI.*—25 parts of

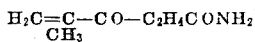

and 25 parts of

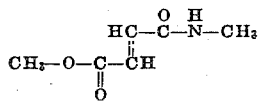

were polymerized as in Example V. A hard, tough resin is obtained.

*Example XVII.*—10 parts of

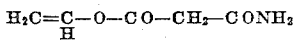

was put in an autoclave and ethylene was pressed in under a pressure of 1000 atmospheres. The temperature was slowly raised to 180–200° C. When polymerization was complete the autoclave was cooled and the product was removed. It was slightly yellow, hard and tough.

*Example XVIII.*—4 parts of

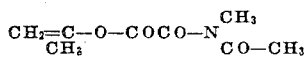

16 parts of butadiene, 0.5 part of urea peroxide, 0.9 part of gelatin, 0.05 part of 2-ethyl hexane, 0.06 part of carbon tetrachloride and 0.18 part of Nekal A (sodium ethyl naphthalene sulfonate) were mixed together with water to form an emulsion and the mixing was continued at 55° C. for 4 days. Then phenyl —α— naphthylamine was added and the polymer was precipitated by adding a suitable acid. The resulting polymer is tough and elastic. In this procedure butadiene derivatives such as 2-methyl butadiene, 2,3-dimethyl butadiene etc. may be used instead of butadiene itself.

*Example XIX.*—20 parts of

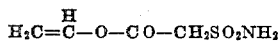

50 parts of acrylonitrile and 10 parts of styrene were polymerized at 40–50° C. using benzoyl peroxide as the catalyst. When polymerization is about 11 to 15% complete, acetone is added together with phenyl-α-naphthylamine and the product is poured into water. The white solid that separates is filtered and dried. Fibers having good textile properties can be spun from this polymer. This interrupted polymerization technique can be used on any of the polymerizations in accordance with my invention, frequently to good advantage.

The resins of my invention are because of their good heat resistance eminently suited to the preparation of filaments and fabrics therefrom in a manner depending on the character of the product. For instance, the resin prepared by the procedure of Example V may be dissolved in acetone and formed into filaments by evaporative spinning.

I claim:

1. The copolymer of the vinyl ester of maleamic acid and vinyl acetate the vinyl ester of maleamic acid constituting at least 20% of the mixture from which the copolymer was formed.

2. The polymer of a composition comprising

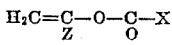

in which Z is a substituent selected from the group consisting of hydrogen, alkyl, and aryl, X is selected from the group consisting of carboxyamide, sulfonamide, R+ carboxyamide and R+ sulfonamide, R being a group selected from the group consisting of phenyl and the aliphatic hydrocarbon groups of 1–4 carbon atoms.

3. The polymer of a composition comprising at least 20% of

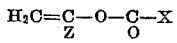

in which Z is a substituent selected from the group consisting of hydrogen, alkyl, and aryl, and X is selected from the group consisting of carboxyamide, sulfonamide, R+ carboxyamide and R+ sulfonamide, R being a group selected from the group consisting of phenyl and the aliphatic hydrocarbon groups of 1–4 carbon atoms and a compound selected from the group consisting of the vinyl compounds, the isopropenyl compounds, and the esters of unsaturated dicarboxylic acids.

4. The copolymer of a composition as in claim 3, the second constituent of which is a vinyl compound.

5. The copolymer of a composition as in claim 3, the second constituent of which is vinyl acetate.

6. The copolymer of a composition as in claim 3, the second constituent of which is dimethyl fumarate.

7. A process for preparing a polymer which comprises heating to a polymerizing temperature a composition comprising

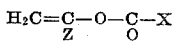

in which Z is a substituent selected from the group consisting of hydrogen, alkyl, and aryl, and X is selected from the group consisting of carboxyamide, sulfonamide, R+ carboxyamide and R+ sulfonamide, R being a group selected from the group consisting of phenyl and the aliphatic hydrocarbon groups of 1–4 carbon atoms.

8. A process for preparing a polymer which comprises heating to a polymerizing temperature a composition as in claim 7 at a pressure of at least 250 atmospheres.

9. A process for preparing a polymer in which a composition as in claim 7 and a compound selected from the group consisting of the vinyl compounds, the isopropenyl compounds, and the esters of unsaturated dicarboxylic acids are used, the composition of claim 7 constituting at least 20% of the mass from which the polymer was prepared.

10. A process for preparing a polymer in which a composition as in claim 7 and vinyl acetate are used, the composition of claim 7 constituting at least 20% of the mass from which the polymer was prepared.

JOSEPH B. DICKEY.

REFERENCES CITED

The following references are of record in the file of this patent:

UNITED STATES PATENTS

| Number | Name | Date |
| --- | --- | --- |
| 2,313,565 | McDowell | Mar. 9, 1943 |